No. 743,312. PATENTED NOV. 3, 1903.
T. M. MURPHY.
DUMPING CART OR WAGON.
APPLICATION FILED JAN. 26, 1903.
NO MODEL.

WITNESSES
Edw. Harrington

INVENTOR
Thomas M. Murphy
BY his ATTORNEYS
Higdon & Longan

No. 743,312. Patented November 3, 1903.

UNITED STATES PATENT OFFICE.

THOMAS M. MURPHY, OF ST. LOUIS, MISSOURI.

DUMPING CART OR WAGON.

SPECIFICATION forming part of Letters Patent No. 743,312, dated November 3, 1903.

Application filed January 26, 1903. Serial No. 140,509. (No model.)

*To all whom it may concern:*

Be it known that I, THOMAS M. MURPHY, of the city of St. Louis, State of Missouri, have invented certain new and useful Improvements in Dumping Carts or Wagons, of which the following is a full, clear, and exact description, reference being had to the accompanying drawings, forming a part hereof.

My invention relates to dumping carts or wagons; and it consists of the novel construction, combination, and arrangement of parts hereinafter shown, described, and claimed.

The object of my invention is to provide an improved dumping cart or wagon principally for use by street-cleaners and in which a rocking body having a receiving-aperture in its top is provided with mechanism whereby said body may be turned to and locked at a point adjacent either side of the vehicle for the convenience of the workmen in filling the said body from either side.

Figure 1:
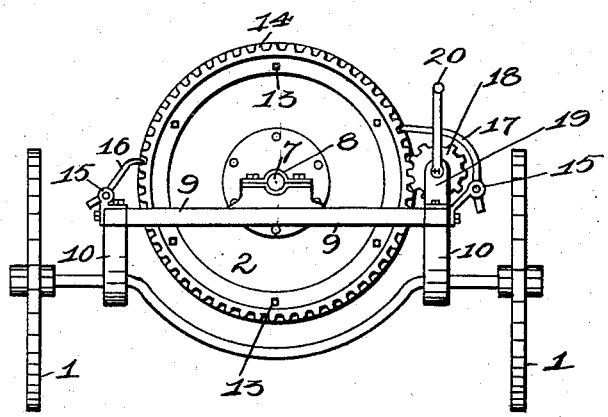
Figure 2:
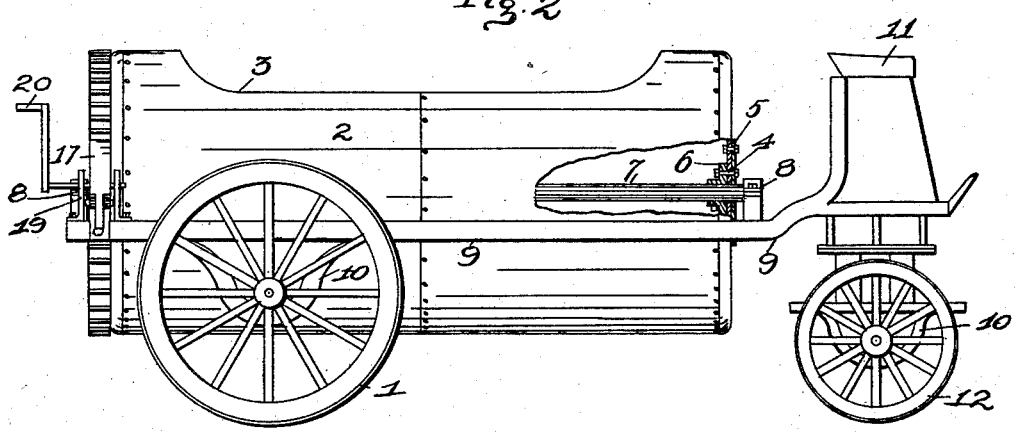

Figure 1 is a rear end elevation of a vehicle embodying my invention. Fig. 2 is a sectional side elevation of my invention.

In carrying out my invention I mount upon two or more supporting-wheels 1 a rocking body 2, which is preferably composed of sheet-iron and in cylindrical form, with the parts riveted together, as in steam-boiler construction. At one side the said body 2 is cut away intermediate of its ends, so as to form a receiving-aperture 3. Fixed centrally upon the opposite heads of the cylindrical body 2 by means of bolts 4 are flanges 5 and 6, arranged to form a reinforcement for receiving the horizontal shaft 7. Said shaft 7 extends horizontally within the said body, and its ends project a suitable distance beyond said heads and are mounted in bearings 8, and such bearings are in turn carried by the frame 9. Said frame is preferably connected with the axles by means of common springs 10, and if the vehicle is of the four-wheeled form I preferably arrange the same as shown, wherein the forward part of the frame 9 is provided with a driver's seat 11 and is supported upon front wheels 12 and ordinary connections.

Secured, preferably, upon the rear end of the body 2 by means of bolts or rivets 13 is a toothed ring 14, and mounted upon both sides of the said body in suitable brackets 15 are pawls 16 and 17, arranged to engage the teeth of said ring and prevent the said body from rocking in either direction.

18 indicates a pinion mounted in brackets 19 and provided with a hand-crank 20.

In operation when it is desired to fill the body from either side of the cart or wagon, according to the convenience of the workmen, the pinion 18 and ring 14 are moved by means of the hand-crank 20 until the receiving-aperture 3 is located adjacent one side of the vehicle, and then the pawls 16 and 17 are adjusted to hold the body in the desired position until filled. After the body has been filled one of the pawls is detached from the teeth of the ring 14, and the body is moved to its normal position, which is that shown in Fig. 2 and wherein the receiving-aperture is at the top.

In dumping the pawl at the side upon which the vehicle is to be dumped is detached from the ring 14, and the hand-crank 20 is rotated in the proper direction to move the body toward the dumping side, and this is continued until the aperture 3 occupies a position at the bottom of the body 2 and which will permit all of the contents of the body to escape therefrom. After the body has been emptied it is placed in its normal position in a manner readily apparent without further description.

My improved dumping-vehicle has a number of advantages over those of the prior art, the principal among which is that the shaft 7 is continuous from end to end of the cylinder and is of great strength, while the body may be rocked from one side to the other, and thereby permit the receiving-aperture 3 to be adjusted at different heights during the filling operation. For instance, when the filling operation is first begun it will be found most convenient to have the receiving-aperture located very low down, as the workmen will thereby be enabled to shovel in the material without lifting it to any considerable height; but as the filling progresses the body should be gradually moved by means of the hand-crank 20, thereby gradually bringing the receiving-aperture nearer the top.

I claim—

An improved dumping cart or wagon, comprising a frame, a body 2 composed of sheet-iron cylindrical in form, the same being cut away on one side intermediate of its ends to form an aperture 3, the shaft 7 extending axially and through said cylindrical body and having projecting ends, the bearings 8 in which the ends of said shaft are mounted, a toothed ring fixed upon rear end of said cylindrical body, pawls 16 and 17 (the free ends of both of which extend inwardly and are) arranged one upon one side of said body and the other upon the diametrically opposite side of said body to engage the teeth of said ring (in opposite directions) and lock the body from turning in either direction, but permitting it to turn in one direction when one of said pawls is detached, and in a reverse direction when the opposite pawl is detached, a pinion meshing with said toothed ring, and a hand-crank to rotate said pinion, substantially as specified.

In testimony whereof I affix my signature in presence of two witnesses.

THOMAS M. MURPHY.

Witnesses:
M. G. IRION,
JOHN C. HIGDON.